(12) United States Patent
Davis

(10) Patent No.: US 11,001,227 B2
(45) Date of Patent: *May 11, 2021

(54) CHILD SAFETY IN A VEHICLE ALERT SYSTEM AND METHOD

(71) Applicant: Jason Davis, Lancaster, TX (US)

(72) Inventor: Jason Davis, Lancaster, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/565,015

(22) Filed: Sep. 9, 2019

(65) Prior Publication Data

US 2019/0389423 A1  Dec. 26, 2019

Related U.S. Application Data

(63) Continuation of application No. 16/195,270, filed on Nov. 19, 2018, now Pat. No. 10,407,021, which is a continuation of application No. 15/444,270, filed on Feb. 27, 2017, now Pat. No. 10,131,318.

(60) Provisional application No. 62/299,933, filed on Feb. 25, 2016.

(51) Int. Cl.
*B60R 22/48* (2006.01)
*G08B 21/02* (2006.01)
*G08B 25/08* (2006.01)

(52) U.S. Cl.
CPC ........ *B60R 22/48* (2013.01); *G08B 21/0205* (2013.01); *G08B 21/0225* (2013.01); *G08B 21/0266* (2013.01); *G08B 21/0283* (2013.01); *G08B 25/08* (2013.01); *B60R 2022/4816* (2013.01)

(58) Field of Classification Search
CPC ............ B60R 2022/4816; B60R 22/48; G08B 21/0205; G08B 21/0225; G08B 21/0266; G08B 21/0283; G08B 25/08
See application file for complete search history.

(56) References Cited

U.S. PATENT DOCUMENTS

| | | | |
|---|---|---|---|
| 6,480,103 B1 | 11/2002 | McCarthy et al. | |
| 6,485,081 B1 | 11/2002 | Bingle et al. | |
| 6,922,154 B2* | 7/2005 | Kraljic | G08B 21/22 180/271 |
| 9,139,162 B1* | 9/2015 | Whitby | G08B 21/0255 |
| 10,131,318 B2 | 11/2018 | Davis | |
| 10,407,021 B2 | 9/2019 | Davis | |

(Continued)

OTHER PUBLICATIONS

U.S. Appl. No. 16/382,947, Non-Final Office Action dated Mar. 23, 2020, 48 pgs.

(Continued)

*Primary Examiner* — Nader Bolourchi
(74) *Attorney, Agent, or Firm* — Foley & Lardner LLP

(57) ABSTRACT

An alert system to assist in child safety in a vehicle includes a seat belt buckle insert adapted to be inserted between the male and female parts of a standard safety belt found in most automobiles or for a child car safety seat. It may also include a portable receiver device designed to be carried by a vehicle operator. The seat belt buckle insert detects whether the seat belt has been buckled and the temperature is within an acceptable range, as well as the approximate distance between the seat belt buckle insert and portable receiver device. The seat belt buckle transmits information gathered to the portable receiver device and triggers alerts notifying the vehicle operator of a child's safety status.

12 Claims, 3 Drawing Sheets

(56) References Cited

U.S. PATENT DOCUMENTS

| | | |
|---|---|---|
| 10,889,263 B2 | 1/2021 | Davis et al. |
| 2002/0161501 A1 | 10/2002 | Dulin et al. |
| 2004/0195449 A1 | 10/2004 | Cordina et al. |
| 2004/0227638 A1 | 11/2004 | Frank et al. |
| 2007/0013531 A1 | 1/2007 | Hules et al. |
| 2007/0182535 A1 | 8/2007 | Seguchi |
| 2012/0256743 A1 | 10/2012 | Horton et al. |
| 2013/0021476 A1 | 1/2013 | Trummer |
| 2013/0109342 A1 | 5/2013 | Welch |
| 2014/0253314 A1 | 9/2014 | Rambadt et al. |
| 2014/0266694 A1 | 9/2014 | McCluskey et al. |
| 2017/0043714 A1 | 2/2017 | Lewis-Cheeks |
| 2017/0046937 A1 | 2/2017 | Chacon et al. |
| 2017/0120813 A1 | 5/2017 | Wilson et al. |
| 2019/0329731 A1 | 10/2019 | Davis et al. |

OTHER PUBLICATIONS

U.S. Appl. No. 16/382,947, Notice of Allowance dated Sep. 22, 2020, 14 pgs.
U.S. Appl. No. 16/382,947, Final Office Action, dated Jul. 13, 2020, 39 pgs.

* cited by examiner

CHILD SAFETY IN A VEHICLE ALERT SYSTEM AND METHOD

CROSS-REFERENCE TO RELATED APPLICATIONS

Pursuant to 35 U.S.C. § 120, this application is a continuation of, and incorporates by reference for all purposes, U.S. patent application Ser. No. 16/195,270, entitled "Child Safety in a Vehicle Alert System and Method," filed Nov. 19, 2018, and naming Jason Davis as inventor, which is a continuation of, and incorporates by reference for all purposes, U.S. patent application Ser. No. 15/444,270, now U.S. Pat. No. 10,131,318, entitled "Child Safety in a Vehicle Alert System and Method," filed Feb. 27, 2017, and naming Jason Davis as inventor, which claims the benefit and priority of Provisional Application No. 62/299,933, entitled "A Preventable Way of Saving Kids Being Left in Cars Dying From Heat Stroke and Hypothermia . . . and Carbon Monoxide Poison," filed Feb. 25, 2016, and naming Jason Jamar Davis as inventor, all of which are incorporated by reference for all purposes.

FIELD OF INVENTION

This invention generally relates to child safety factors in vehicles.

BACKGROUND OF THE INVENTION

Unfortunately, each year there are many children deaths related to improper buckling or being left unattended in a vehicle. Children may go quiet after falling asleep or day care centers may lose track of a child in a vehicle while tending to other children. A vehicle operator may subsequently forget a child was left unattended in a vehicle.

BRIEF SUMMARY OF THE INVENTION

The present invention relates to one or more aspects of a system to be used with a vehicle seat or child car seat, for alerting vehicle operator of the possibility of a child's presence in a vehicle that may no longer be attended, and/or improper, and/or unsafe.

In an exemplary embodiment, a child safety vehicle alert system and method may substantially eliminate or reduce one or more disadvantages and problems associated with previous systems and methods. The alert system can be adapted and used with any car seat, including a child car seat in a vehicle with standard safety belts.

In accordance with one aspect of the exemplary embodiment, the alert system has two components. At least one is intended to be with the driver of the vehicle or other adult passenger. The component devices are portable and communicate with each other through wireless transmission. One component comprises a seat belt buckle insert, the insert component configured to work with standard equipment seat belts and seat belt buckles found in new cars sold in the United States and in most other countries. The second component comprises a portable receiver. The seat belt buckle insert transmits messages to the portable receiver. The second component then generates a sensory signal that can be perceived by a person carrying the second component. For example, the sensory signal can be a visual, audible, or other. In accordance with another aspect of an exemplary embodiment, the seat belt buckle insert contains sensors located on a male portion and a female portion of the buckle insert for sensing the position latching of each portion to a complementary portion of a safety belt. The seat belt buckle indicates to the portable receiver attached to a vehicle operator's keys whether a child is properly buckled in a seat. The portable receiver device activates a green light when a child is properly buckled, and activates a red light when a child is improperly buckled.

In accordance with another aspect of an exemplary embodiment, the alert system also contains a temperature sensor within the seat belt buckle insert. The temperature sensor determines whether the temperature within a vehicle is within a predetermined range. The predetermined temperature range is stored in a memory chip located inside the seat belt buckle insert. The predetermined temperature range is set based on temperatures determined to be acceptable for a child inside a vehicle. The seat belt buckle insert transmits wireless communication regarding temperature to the portable receiver with a vehicle operator. Should the temperature range determined by the seat belt buckle insert fall below, or exceed the acceptable predetermined temperature range, a red light will be activated on the portable receiver. Should the temperature in a vehicle remain within the acceptable predetermined range, a green light will remain activated on the portable receiver.

In accordance with another aspect of an exemplary embodiment, the alert system also contains a location monitoring system within the seat belt buckle insert and the portable receiver. The location monitoring system determines whether the distance between the seat belt buckle insert and the portable receiver is exceeded. Should the predetermined distance be exceeded, the portable receiver will alert the vehicle operator by activating a red light. Should the distance between the seat belt buckle insert and portable receiver remain within the predetermined distance, a green light will remain activated on the portable receiver.

The alert system is simple and inexpensive. The alert system works universally with any car seat, or child car seat and is highly portable. The alert system further works with any vehicle, including older manufactured vehicles.

In an alternative embodiment, the buckle insert component comprises software running on a mobile smart phone.

These and other aspects of the invention are attained with the alert system for alerting a vehicle operator of the presence and proper buckling of a child in a car seat, the alert system seat belt buckle insert containing at least: a memory chip, location monitoring system, temperature sensor, wireless transmitter, central processing unit, and sensors coupled to the male portion and female portion of the seat belt buckle insert. The sensors coupled to the male portion and female portion of the seat belt buckle insert configured to determine whether the seat belt buckle is properly buckled. The seat belt buckle insert's temperature sensor configured to determine whether the vehicle's temperature is within an appropriate predetermined temperature range. The seat belt buckle insert's location monitoring system configured to determine whether the seat belt buckle insert and the portable receiver are within a predetermined distance from each other.

According to the above embodiments, said wireless transmitting and receiving means each include separate power sources and each, respectively, are adapted to transmit and receive signals.

According to the above embodiments, there is provided a method of warning a vehicle operator that a child has been left buckled in a car seat comprising: connecting a seat belt buckle insert to a car seat belt or child car seat belt, said seat belt buckle insert also connecting to the car seat buckle or child car seat buckle; determining whether the seat belt buckle is property buckled; further determining whether a child is safely buckled through sensors located on the female portion and male portion of the seat belt buckle; communicating whether the seat belt buckle is properly buckled to a portable receiver; and activating a light indicator on the portable receiver device, wherein a green light indicates to the vehicle operator that the seat belt buckle is properly buckled, wherein a red light indicates to the vehicle operator that the seat belt buckle is not properly buckled.

According to another embodiment of the method, further comprising: detecting a distance between the seat belt buckle and the portable receiver device; determining whether the location between the seat belt buckle insert and the portable receiver exceeds a predetermined distance stored in a memory chip located within the seat belt buckle insert and through a location monitoring system; transmitting distance information wirelessly to the portable receiver device; activating a light indicator on the portable receiver device, wherein a green light indicates to the vehicle operator that the seat belt buckle is within the predetermined distance from the portable receiver device, wherein a red light indicates to the vehicle operator that the seat belt buckle insert is not within the predetermined distance from the portable receiver.

According to another embodiment, there is provided a method further determining whether the temperature within a vehicle is within a certain predetermined temperature range stored on the memory chip through a temperature sensor; transmitting temperature range information wirelessly to the portable receiver; activating light indicators on the portable receiver configured to indicate to a vehicle operator whether the child is safely secured in a vehicle, whether the temperature range within the vehicle is safe, and whether the distance between the seat belt buckle insert and portable receiver is safe.

DETAILED DESCRIPTION OF THE INVENTION

In the following description, like numbers refer to like elements.

Figures 1, 2:
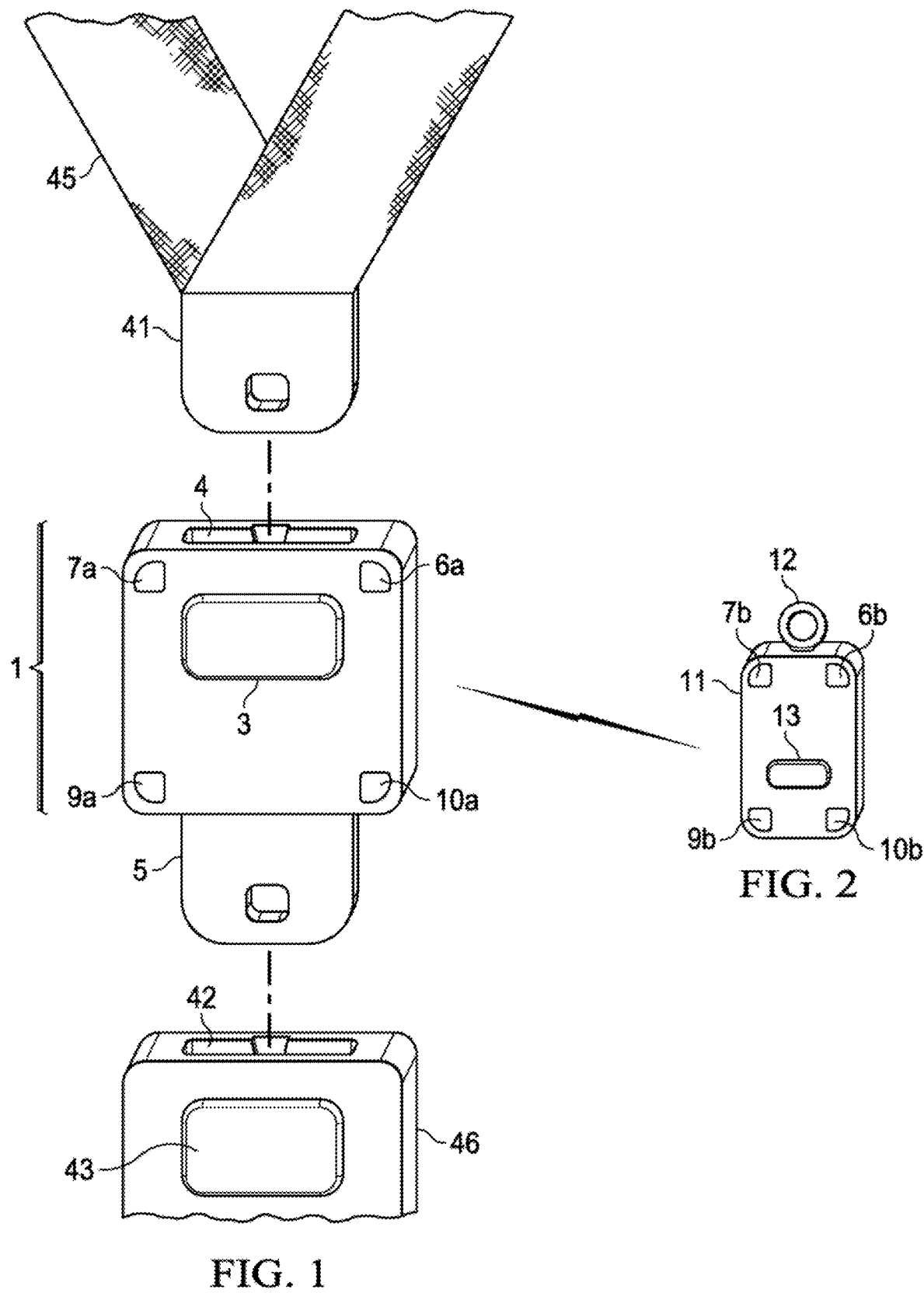
FIG. 1 is a view of a safety belt insert and car seat belt.
FIG. 2 illustrates a representative a key fob.

Turning now to FIG. 1 illustrates how a seat belt insert 1 is used with a tongue (male component) 41 and buckle (female component) 42 of a connector used to fasten two lengths 45 and 46 of a seat belt, such as a seat belt that is factory installed in passenger motor vehicles or on infant car seats. The insert has a tongue 5 that inserts into the buckle 42 of the seat belt connector, and a buckle 4 that is adapted to receive and latch the tongue 41. A latch inside of the female buckle 42 locks the tongue of the male 5 end in place and firmly secures the two components together. The tongue 5 of the insert 1 is released by pressing the release button 43 on the buckle 42 of the seat belt, that opens the latch (not visible). The buckle 4 end of the insert is adapted to receive tongue 41 the seat belt, with its latch (not visible) released by pressing release button 3 on the insert 1 and pulling out the tongue 41. The particular seat belt assembly configuration shown in the figure has been provided as an example of one type of seatbelt assembly the seat belt straps 45 and 46, the tongue, and the buckle, other internal latching components of the connection can be constructed according to any one of a number of known designs.

A portable key fob 11, depicted FIG. 2, is an example of a portable device for communication with the insert. The insert 1 wirelessly transmits, and the portable device receives from the insert 1, messages indicating the state or condition of one or more of the following: (1) the latching of insert 1 with the car seat, as indicated by sensors located within the insert; and (2) one or more environmental conditions, such as ambient temperature, sensed by an environmental condition sensor in the insert. The portable device and the insert may also work together to determine whether the portable device is likely beyond at least a predetermined distance when the insert remains bucked in the seat belt, the predetermined distance. It may make this determination based on one or more of: signal strength, changes in signal strength, and the detection and non-detection of a signal.

In one embodiment, insert 1 and key fob 11 each have four corresponding lights. Lights 7a and 7b if the insert is powered on, if the key fob 11 is the proper distance from the insert 1 the user will be notified by the corresponding light 6a/b. Lights 10a and 10b will illuminate, change color and/or exhibit a predetermined visual pattern if both the male and female end of the insert are properly engaged. Lights 9a and 9b will illuminate to indicate the ambient temperature sensed by the insert. For example, it may illuminate, or change colors, depending on whether the temperature is within (or below or above) an acceptable, predetermined temperature or temperature range, or outside (or above or below) a predetermined, acceptable temperature or temperature range. For example, all four of these lights are illuminated by a color changing LED that displays a green color and red color. For the power lights 7a and 7b, a green color will be displayed when the insert and key fob are powered on. The circuitry controlling power lights 7a and 7b will cause the lights to blink when the battery power displayed by either the key fob power light 7b or insert power light 7a is less than a predetermined level, for example, a 25% of the battery's power. The distance indicator lights 6a and 6b will display a first color (for example, green) when the key fob 11 is within a predetermined distance from the insert 1, or when the key fob can detect messages sent by the insert; and it will display a red color on both the insert's light 6a and key fob's light 6b when the key fob 11 is outside of the preset distance or range from insert 1. The seatbelt indicator lights 10a and 10b will display a green color on both the insert's light 10a and key fob's light 10b when the insert 1 is engaged with the seat belt at both its male 5 and female 4 end. When either the male 5 of female 6 end of the insert 1 is not completely engaged with the seat, and the insert 1 is powered on, both the insert's light 10a and key fob's light 10b will display a red color to indicate to the user that the insert 1 is not completely engaged with the seat belt. Finally, when the internal temperature of the vehicle is outside of the predetermined temperature range, the insert temperature light 9a and key fob temperature light 9b, a red color will be depicted on both lights. When the internal temperature of the vehicle is within the predetermined temperature range, the insert temperature light 9a and key fob temperature light 9b, a green color will be depicted on both lights.

Figure 3:
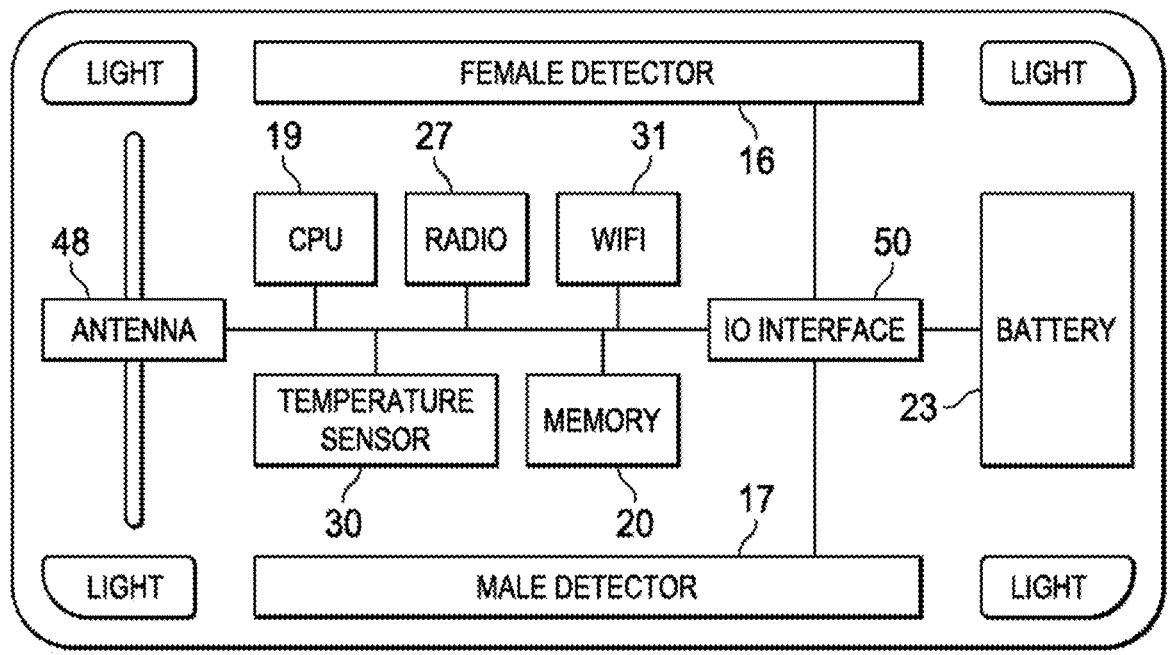
FIG. 3 is schematic illustration of a non-limiting example of circuitry and other components of the safety belt insert of FIG. 1.
Figure 4:
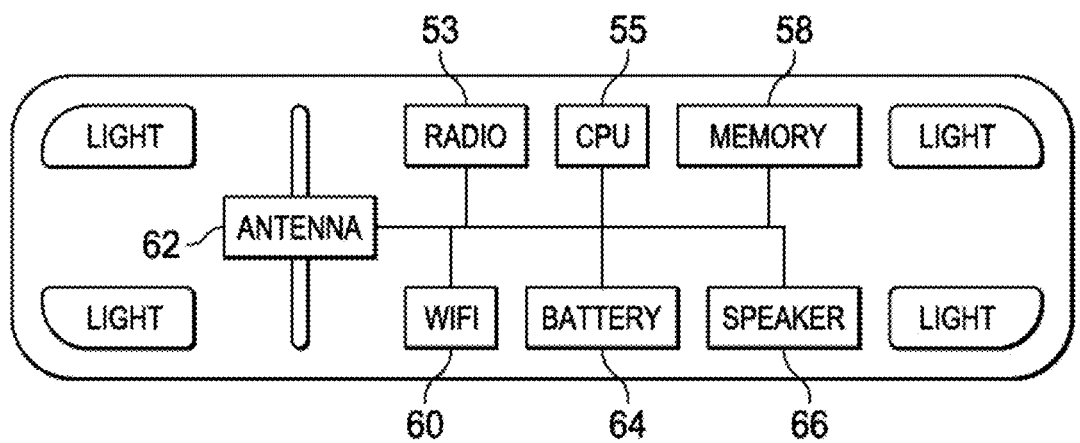
FIG. 4 illustration of a non-limiting example of circuitry and other components of the key fob of FIG. 2.

FIG. 3 shows a non-limiting schematic diagram of circuitry comprising insert 1. A battery 23, which can consist of one or multiple batteries, powers the insert 1. Detector 17 comprises either a pressure switch that is senses when the tongue 5 of the insert is pressed into the buckle 42 of the car seat, or it can comprise a proximity detector that can sense a buckle 42. It may comprise, in alternative embodiments, other ways of detecting the insertion of the tongue 5 into a buckle. Detector 16 can be one of a pressure switch, proximity detector, or a lever system that activates a switch, or other device that is, for example, moved by the insertion of the tongue 41 of a seat belt into the buckle 4 of the insert. The detectors 16, 17 are coupled with an input/output interface 50, which communicates the conditions of the detector to CPU 19. Several functions and processes of the insert are implemented, in this illustrated example, by software stored in internal memory 20 executed by CPU 19. However, other implementations using hardware only, or hardware/software combinations, are possible. Based on the inputs of the detectors 16 and 17, as well as the temperature sensor 30, the processes being performed by the CPU under direction of the software cause the lights (or other visual or sensory indicators) to change to indicate the state of the insert. The insert 1 causes visual indicators to form and send messages to fob 11 (or other portable device) wirelessly. The insert 1 can include an antenna 48 for transmitting. Transmissions are received by the key fob 11 through the key fob's internal antenna 62 and radio 53.

The insert 1 contains a temperature sensor 30 that is able to read the atmosphere surrounding the insert 1 when placed inside of a vehicle. The temperature sensor 30 can be a digital thermometer, thermocouple sensor, resistance temperature detector (RTD), thermistors, pyrometer, or other similar methods. When the temperature sensor 30 detects a temperature that is outside of the range of the operating software, a signal is sent to key fob 11 and the temperature light 9a/b on both the insert 1 and key fob 11 change colors from green to red. The signal is sent from the insert to the key fob through a means of wireless communication such as 4G, 3G, 2G, Bluetooth, RF, 802.11, AM or FM to the key fob 11. The insert 1 can include an antenna 48 for radio transmissions as well. Transmissions are received by the key fob 11 through the key fob's internal antenna 62, radio 53, or wifi 60.

In one example, the insert 1 and the key fob 11 each include a Bluetooth Low Energy 4.0 radio to communicate. When the key fob 11 is separated by at least a predetermined distance from the insert 1, the distance indicator light 6a/b on both the insert 1 and key fob 11 will turn from green to red.

Anytime the user is alerted through one of the four indicator lights on the key fob 11, an accompanying alarm is also sounded through the key fob's speaker 66 to notify the user that a change in condition has occurred.

A portable electronic device can be used in place of the key fob 11. The device would include a wireless receiver and, optionally, a transmitter. The portable electronic device may include an enabled location-determining device, such as a Global Positioning System (GPS) device, a triangulations device, or through Wi-Fi assessment, for providing location information to the insert 1. An application running on, for example, a "smartphone" or similar type of device could serve as the portable electronic device for receiving messages from the insert and notifying the user of one or more of conditions associated with the insert, such power of the insert, seatbelt status, temperature of the vehicle, and distance from the insert 1.

Figure 5:
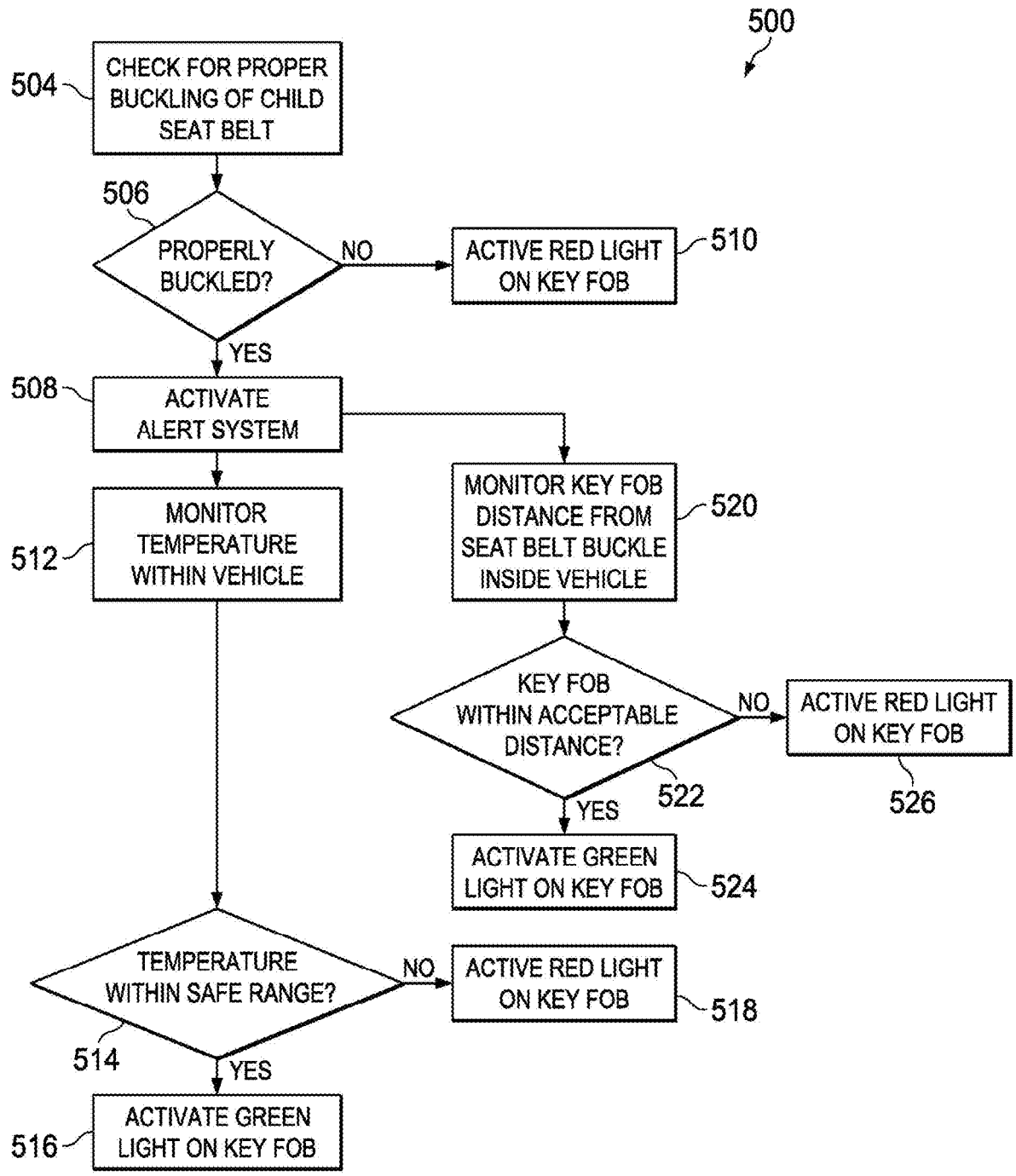
FIG. 5 is a flowchart describing a process for alerting the possible presence of a child using the safety belt insert of FIG. 1 and the key fob of FIG. 2.

FIG. 5 describes a monitoring and alert process 500 after a child is buckled into a car seat at step 502 using the insert 1. The insert 1 is attached between the male 41 and female 42 ends of a vehicle's seat belt 45, 46 or a child car seat. The indicators 10a and 10b will notify the user of the detectors 16,17 (see FIG. 2) as the insert 1 monitors the proper buckling of the vehicle or child seat belt at step 504. If the insert is properly attached at step 506, the alert system will activate at step 508 and a portable device will indicate that it has been activated by, for example, indicating turning on or changing the color of a status light on the key fob, or by changing a notification generated by an application on a smartphone. If the insert 1 is not properly connected to both the tongue and the buckle of a car seat, the user can be advised by a status light, for example a red light on the key fob, as indicated by step 510. The user can also be notified audibly of the status of the insert and additional information generated by the insert by a sound from the key fob's 11 speaker 66. While the insert 1 is properly attached, the alert system is active, as indicated by step 508, and the seat belt insert 1 will monitor whether key fob 11 is within a predetermined, acceptable range. The key fob 11 will indicate to the user that it is within an acceptable range by, for example, displaying a visual indicator, such as a green light, 524. If the fob will indicate, for example, with a red light 526 when it is outside of an acceptable range from the insert 1. The user can also be notified by a sound from the key fob's 11 speaker 66. While the alert system insert 1 is active 508, the temperature within the vehicle will be monitored at step 512. The alert system will determine if the temperature is within a predetermined safe range at step 514. It will indicate to the user with a green light 516 if the temperature is within a safe range, and will indicate to the user with a red light 518 when the temperature is outside of the safe range. The user can also be notified by a sound from the key fob's 11 speaker 66.

The foregoing description is of exemplary and preferred embodiments. The invention, as defined by the appended claims, is not limited to the described embodiments. Alterations and modifications to the disclosed embodiments may be made without departing from the invention. The meaning of the terms used in this specification are, unless expressly stated otherwise, intended to have ordinary and customary meaning and are not intended to be limited to the details of the illustrated or described structures or embodiments.

What is claimed is:

1. A method of alerting a user of safety of a person by an alert system comprising a safety device, the method comprising:
   determining, by a first sensor of the safety device, that a portion of the safety device is connected to a corresponding portion of a safety belt;
   in response to the determining by the first sensor, transmitting wirelessly by a wireless transmitter to a portable receiver device that the safety belt is properly connected to the safety device;
   further in response to the determining by the first sensor, alerting the user that the safety belt is properly connected to the safety device,
   wherein the wireless transmitter is disposed inside an interior cavity of the safety device.

2. The method of claim 1, further including:

detecting a distance between the safety device and the portable receiver device, and alerting the user when the distance is outside a predetermined acceptable range.

3. The method of claim 1, further including:
determining whether a temperature detected by a second sensor of the safety device is within a predetermined acceptable range.

4. The method of claim 3, further including: alerting the user when the temperature is out of said predetermined acceptable range.

5. The method of claim 2, further including wirelessly communicating with a programmable cellular telephone comprising the portable receiver device, wherein the alerting comprises an indication provided by the programmable cellular telephone.

6. The method of claim 1, wherein the alerting comprises an indication provided by at least one of a LED of the safety device and an LED of the portable receiver device.

7. An alert system to monitor safety comprising:
a portable monitoring device configured to connect to a safety belt, the portable monitoring device comprising:
a connecting portion for releasably connecting with a safety belt;
a sensor for sensing connection of the connecting portion of the portable monitoring device to the safety belt;
a wireless transmitter in the portable monitoring device and configured to transmit alert messages, wherein the alert messages are generated by the portable monitoring device indicating at least one of: a connection status of the portable monitoring device with the safety belt and an indication that the portable monitoring device has exceeded a predetermined distance from a portable wireless receiver.

8. The alert system of claim 7, further comprising a temperature sensor configured to determine a temperature and to determine whether the temperature of the portable monitoring device is within a predetermined acceptable temperature range and, wherein the portable monitoring device alerts a user when the temperature is outside of the predetermined range.

9. The alert system of claim 7, wherein the portable monitoring device contains a plurality of visual indicators configured to at least one of (i) indicate a connection status of the connecting portion with the safety belt and (ii) indicate that the portable monitoring device has exceeded a predetermined distance from the portable wireless receiver.

10. The alert system of claim 7, wherein the portable wireless receiver comprises an application running on programmable cellular telephone for displaying messages from the portable monitoring device.

11. The alert system of claim 7, wherein the portable monitoring device is connected to a child safety seat.

12. The alert system of claim 7, wherein the wireless transmitter in the portable monitoring device is a cellular data transmitter.

* * * * *